United States Patent
Kanaya

(10) Patent No.: US 8,767,273 B2
(45) Date of Patent: Jul. 1, 2014

(54) IMAGE-READING SYSTEM

(75) Inventor: Shingo Kanaya, Ishikawa (JP)

(73) Assignee: PFU Limited, Ishikawa (JP)

( * ) Notice: Subject to any disclaimer, the term of this patent is extended or adjusted under 35 U.S.C. 154(b) by 99 days.

(21) Appl. No.: 13/434,114

(22) Filed: Mar. 29, 2012

(65) Prior Publication Data

US 2012/0320431 A1    Dec. 20, 2012

(30) Foreign Application Priority Data

Jun. 15, 2011 (JP) ................................. 2011-133429

(51) Int. Cl.
*H04N 1/04* (2006.01)

(52) U.S. Cl.
USPC ............................ 358/475; 358/474; 358/501

(58) Field of Classification Search
USPC .................... 358/474, 1.15, 442, 403, 501
See application file for complete search history.

(56) References Cited

U.S. PATENT DOCUMENTS

| | | | |
|---|---|---|---|
| 5,218,200 A | 6/1993 | Morii et al. | |
| 5,515,181 A | 5/1996 | Iyoda et al. | |
| 5,625,183 A | 4/1997 | Kashitani et al. | |
| 5,760,925 A | 6/1998 | Saund et al. | |
| 5,764,383 A | 6/1998 | Saund et al. | |
| 5,818,612 A | 10/1998 | Segawa et al. | |
| 5,835,241 A | 11/1998 | Saund | |
| 5,969,829 A | 10/1999 | Matsuda et al. | |
| 5,978,102 A | 11/1999 | Matsuda | |
| 6,164,740 A | 12/2000 | Hirai et al. | |
| 6,316,767 B1 | 11/2001 | Paxton et al. | |
| 6,325,288 B1 | 12/2001 | Spitz | |
| 6,609,162 B1 * | 8/2003 | Shimizu et al. | 710/15 |
| 6,738,166 B1 | 5/2004 | Kano et al. | |
| 6,771,394 B1 | 8/2004 | Nakanishi et al. | |
| 6,963,428 B1 | 11/2005 | Gann | |
| 6,965,460 B1 | 11/2005 | Gann et al. | |
| 7,460,279 B2 * | 12/2008 | Iwasaki | 358/450 |
| 7,460,284 B2 | 12/2008 | Hiromatsu | |
| 7,612,162 B2 * | 11/2009 | Okada et al. | 530/300 |
| 7,652,781 B2 * | 1/2010 | Fukui et al. | 358/1.15 |
| 7,724,390 B2 * | 5/2010 | Imai | 358/1.18 |
| 7,730,191 B2 * | 6/2010 | Otsuka et al. | 709/227 |

(Continued)

FOREIGN PATENT DOCUMENTS

| | | |
|---|---|---|
| JP | 63-107366 A | 5/1988 |
| JP | 2005-073116 A | 3/2005 |
| JP | 2011-055165 A | 3/2011 |

OTHER PUBLICATIONS

United States Office Action issued in U.S. Appl. No. 13/111,498 dated Aug. 21, 2013.

(Continued)

*Primary Examiner* — Negussie Worku
(74) *Attorney, Agent, or Firm* — McDermott Will & Emery LLP

(57) ABSTRACT

An image-reading system that includes a plurality of image-reading apparatuses each including a document reading start instructing unit, and an information processing terminal connected to the image-reading apparatuses, wherein each of the image-reading apparatuses includes a detecting unit that detects that a user operates the document reading start instructing unit, a reading unit that reads a document when the detecting unit detects the operation of the user, and an image file transmitting unit that transmits an image file of the document read by the reading unit to the information processing terminal.

6 Claims, 5 Drawing Sheets

(56) References Cited

U.S. PATENT DOCUMENTS

| | | |
|---|---|---|
| 7,731,662 B2 | 6/2010 | Anderson et al. |
| 7,916,331 B2 * | 3/2011 | Shinozaki ............... 358/1.15 |
| 7,982,919 B2 * | 7/2011 | Mishima et al. ............ 358/402 |
| 8,137,010 B2 | 3/2012 | Yoshida et al. |
| 8,218,208 B2 * | 7/2012 | Hayashi ................ 358/520 |
| 8,294,924 B2 * | 10/2012 | Takayama ............... 358/1.15 |
| 8,320,608 B2 * | 11/2012 | Saito et al. ............... 382/100 |
| 8,356,084 B2 * | 1/2013 | Yamamoto .............. 709/219 |
| 8,427,719 B2 * | 4/2013 | Fujiwara ................ 358/488 |
| 8,436,786 B2 * | 5/2013 | Kamoto ................... 345/1.1 |
| 8,503,045 B2 | 8/2013 | Kubo et al. |
| 8,542,404 B2 * | 9/2013 | Usui ..................... 358/1.9 |
| 8,553,292 B2 * | 10/2013 | Mihira ................... 358/402 |
| 2005/0175365 A1 | 8/2005 | Gomi |
| 2007/0041039 A1 * | 2/2007 | Doui ..................... 358/1.15 |
| 2010/0302607 A1 | 12/2010 | Hock |
| 2011/0299135 A1 | 12/2011 | Takabatake |
| 2011/0299136 A1 | 12/2011 | Kubo et al. |
| 2012/0314264 A1 | 12/2012 | Kimura |
| 2012/0320434 A1 | 12/2012 | Takeda |
| 2012/0320437 A1 | 12/2012 | Kanaya |

OTHER PUBLICATIONS

United States Office Action issued in U.S. Appl. No. 13/369,035 dated Jul. 26, 2013.
United States Office Action issued in U.S. Appl. No. 13/445,436 dated Sep. 11, 2013.
United States Office Action issued in U.S. Appl. No. 13/444,567 dated Nov. 4, 2013.
United States Office Action issued in U.S. Appl. No. 13/464,742 dated Sep. 19, 2013.
United States Office Action issued in U.S. Appl. No. 13/075,720 dated Apr. 2, 2013.
United States Office Action issued in U.S. Appl. No. 13/075,720 dated Oct. 15, 2013.

* cited by examiner

FIG.3

| READING MODE | READ RESOLUTION | AUTOMATIC RESOLUTION |
| --- | --- | --- |
| | | 150 dpi |
| | | 200 dpi |
| | | 300 dpi |
| | | 600 dpi |
| | COLOR MODE | AUTO-DETECT |
| | | COLOR |
| | | GRAYSCALE |
| | | MONOCHROME |
| | | COLOR HIGH-COMPRESSION |
| | SCANNING SIDE | SINGLE SIDE |
| | | DOUBLE SIDE |
| | OTHER IMAGE PROCESSING | MONOCHROME SCANNING DENSITY |
| | | CHARACTER DOCUMENT MODE |
| | | PHOTOGRAPH MODE |
| | | FORM MODE |
| | | DELETE BLANK |
| | | STRING SKEW CORRECTION |
| | | DOCUMENT ORIENTATION CORRECTION |
| | | DOCUMENT SKEW CORRECTION |
| | | SHADOW |
| | | HIGH LIGHT |
| | | γ |

| DOCUMENT | DOCUMENT SIZE | AUTOMATIC PAGE SIZE DETECTION |
| --- | --- | --- |
| | | A3 |
| | | A4 |
| | | A5 |
| | | A6 |
| | | B4 |
| | | B5 |
| | | B6 |
| | | POSTCARD |
| | | BUSINESS CARD |
| | | LETTER |
| | | DOUBLE LETTER |
| | | CUSTOM SIZE |
| | CHECK OVER-LAPPING | CHECK OVERLAPPING |
| | | CHECK LENGTH |
| | | NONE |

IMAGE-READING SYSTEM

CROSS-REFERENCE TO RELATED APPLICATION

This application is based upon and claims the benefit of priority from Japanese Patent Application No. 2011-133429, filed Jun. 15, 2011, the entire contents of which are incorporated herein by reference.

BACKGROUND OF THE INVENTION

1. Field of the Invention

The present invention relates to an image-reading system.

2. Description of the Related Art

Dual mode and other techniques have been developed for reading images using a plurality of image-reading apparatuses connected to an information processor.

For example, JP-A-2011-55165 discloses a technique for connecting both of an auto document feeder (ADF) scanner and a flat bed scanner to an information processor or connecting the ADF scanner to the flat bed scanner to connect the information processor with a single interface.

JP-A-2005-73116 discloses a method in which an ADF scanner or a flat bed scanner is selected by using an information processor for reading a document and a technique for detecting that a document is set on the ADF scanner and notifies the information processor of selection of a scanner reading the document.

According to the technique disclosed in JP-A-2011-55165, the selection of a scanner driver can be simplified when two image-reading apparatuses are connected, however, there is a problem in that the technique cannot be applied to a case when documents are continuously read among a plurality of scanners. The technique disclosed in JP-A-2005-73116, which selects a scanner reading the document by operation through the image processor, has a problem in that operation of reading cannot be performed by each of the image-reading apparatuses.

SUMMARY OF THE INVENTION

It is an object of the present invention to at least partially solve the problems in the conventional technology.

An image-reading system according to one aspect of the present invention includes a plurality of image-reading apparatuses each including a document reading start instructing unit, and an information processing terminal connected to the image-reading apparatuses, wherein each of the image-reading apparatuses includes a detecting unit that detects that a user operates the document reading start instructing unit, a reading unit that reads a document when the detecting unit detects the operation of the user, and an image file transmitting unit that transmits an image file of the document read by the reading unit to the information processing terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an example of setting data stored in the setting file 106a;

DETAILED DESCRIPTION OF THE PREFERRED EMBODIMENT

Embodiments of an image-reading system according to the present invention will be explained in detail below based on the drawings. The embodiments do not limit the invention.

Configuration of the Embodiment

Figure 1:
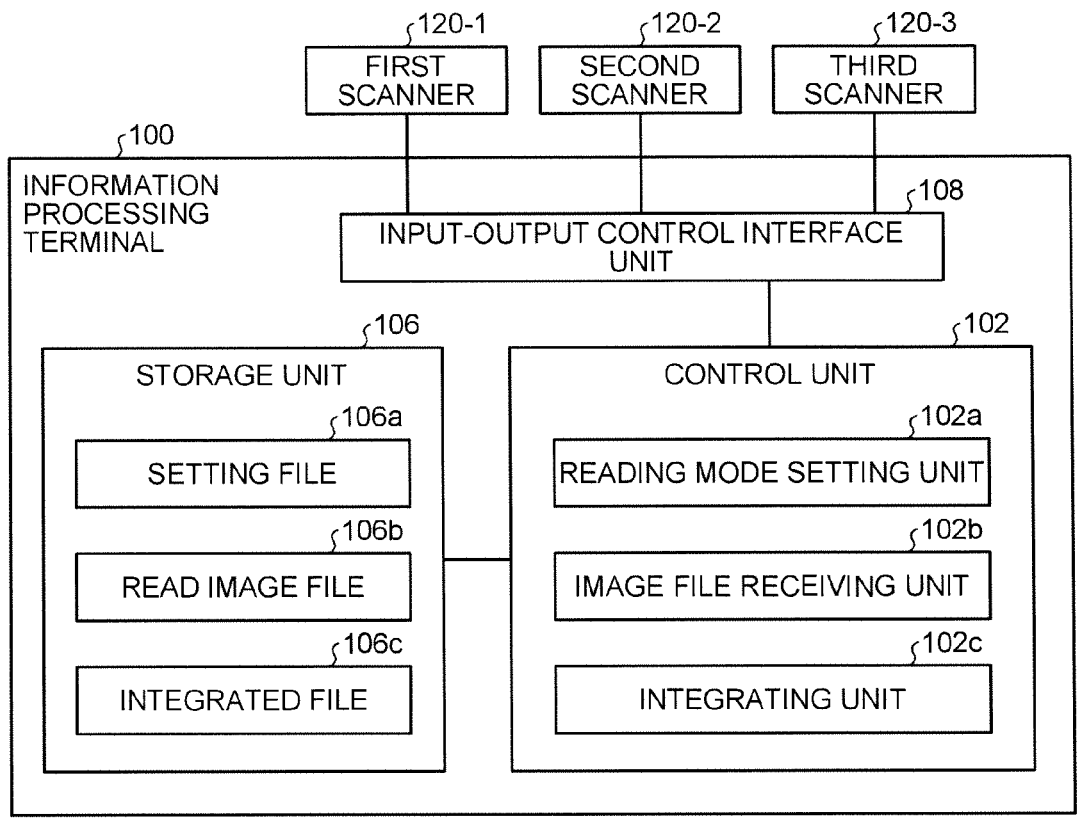
FIG. 1 is a block diagram of an example of a configuration of an information processing terminal 100.
Figure 2:
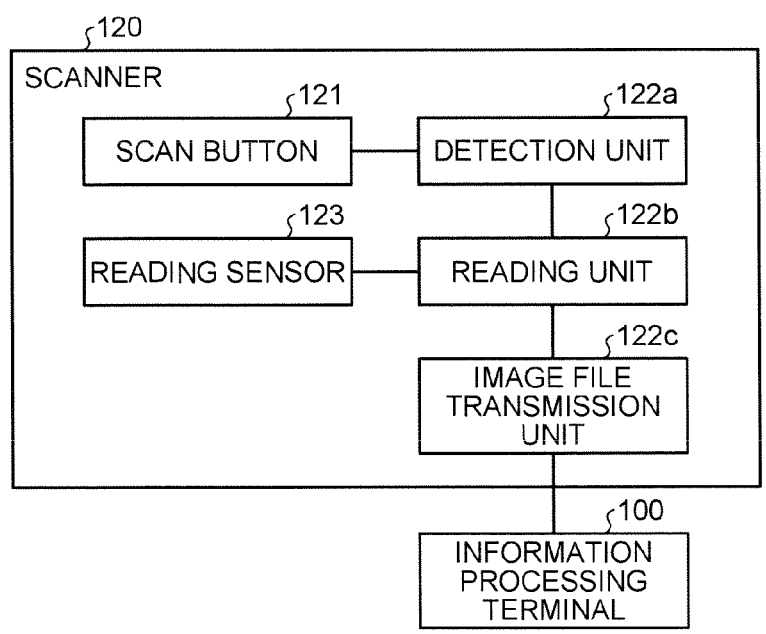
FIG. 2 is a block diagram of an example of a configuration of a scanner 120.

The configuration of an image-reading system including an information processing terminal 100 and a plurality of scanners 120, according to the present embodiment is explained below. FIG. 1 is a block diagram of an example of a configuration of the information processing terminal 100, and this figure conceptually depicts only portions related to the present invention based on the configuration. FIG. 2 is a block diagram of an example of a configuration of the scanner 120, and this figure conceptually depicts only portions related to the present invention based on the configuration.

As shown in FIG. 1, the information processing terminal 100 is connected to a plurality of scanners 120. In this embodiment, the information processing terminal 100 connected to three scanners 120, which are a first scanner 120-1 to a third scanner 120-3, is explained as an example, however the embodiments is not limited to this example. The information processing terminal may be connected to a given number more than two of image-reading apparatuses.

As shown in FIG. 1, the information processing terminal 100 schematically includes a control unit 102 such as a central processing unit (CPU) that integrally controls the entire of the information processing terminal 100, an input-output control interface unit 108 connected to the scanners 120, and a storage unit 106 that stores various databases and tables. Each unit of the information processing terminal 100 is communicably connected to one another via any communication channels.

In FIG. 1, the storage unit 106 stores the various databases, and tables (a setting file 106a, a read image file 106b, and an integrated file 106c). The storage unit 106 is storage means such as a fixed disk device, and stores therein program, tables, files, databases and so on for various processes.

Among the components of the storage unit 106, the setting file 106a is a set condition storage unit that stores various setting data. For example, the setting file 106a may store set modes to be set to each of scanners 120. FIG. 3 is a diagram of an example of the setting data stored in the setting file 106a.

As shown in FIG. 3, the setting file 106a may store therein setting data relating to a reading mode and a document, for example. For example, among the reading modes illustrated in FIG. 3, read resolution, which relates to the resolution when an image of a document is read, to be set can be defined so as to correspond to each of the scanners 120 as automatic resolution, 150 dpi, 200 dpi, 300 dpi, and 600 dpi. For another example, a size to be set can be defined from a document size illustrated in FIG. 3 as size automatic detection, A3, A4, A5, A6, B4, B5, B6 postcard, name card, letter, double letter, and custom sizes. An example of a setting method of setting data is described later with reference to FIG. 4.

Referring back to the explanation of FIG. 1, the read image file 106b is a read image storage unit that stores therein an image file that is read and transmitted by the scanner 120. The read image file 106b may store therein images for each scanner 120 or image files after being image-processed.

The integrated file 106c is an integrated image file storage unit that integrates a plurality of image files read by the scanners 120 and stores therein the integrated file. For example, the integrated file 106c may integrate the image files with a portable document format (PDF) and store therein the PDF file.

The input-output control interface unit 108 controls the scanners 120 such as the first scanner 120-1, the second scanner 120-2, and the third scanner 120-3.

The control unit 102 includes an internal memory for storing a control program such as an OS (Operating System), programs that define various processing procedures, and necessary data. The control unit 102 performs information processing for executing various processing by these programs or the like. The control unit 102 schematically includes a reading mode setting unit 102a, an image file receiving unit 102b, and an integrating unit 102c.

Figure 4:
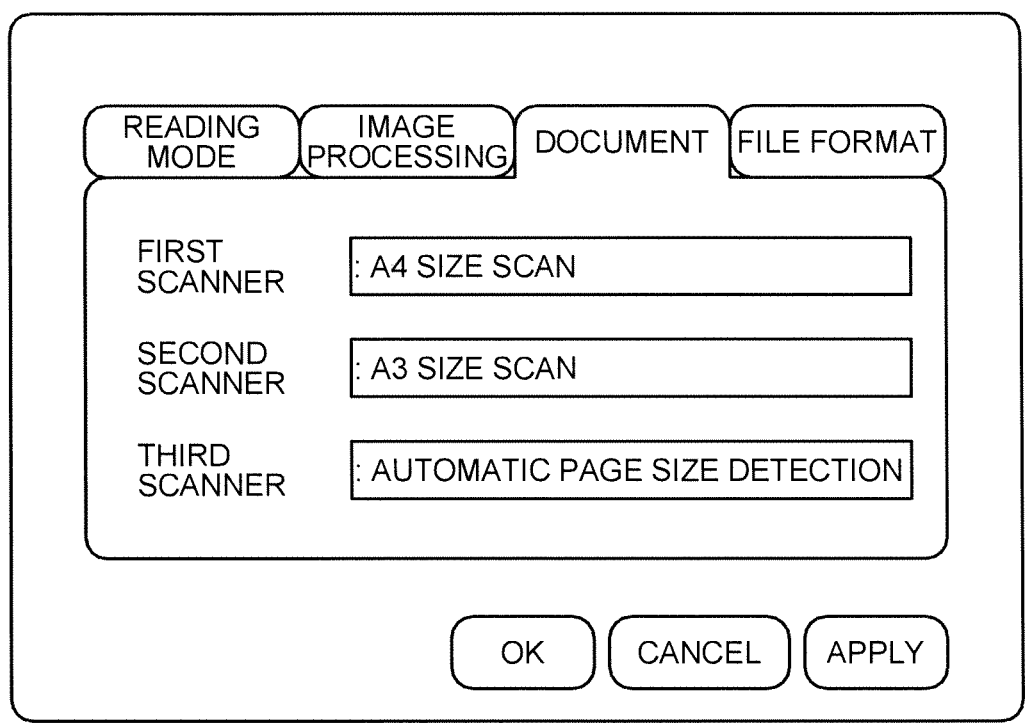
FIG. 4 is a diagram of an example of a setting screen that allows a user to register the setting data such as the reading mode.

The reading mode setting unit 102a is a reading mode setting unit that sets the reading mode to each scanner 120 through the input-output control interface unit 108 based on the setting data stored in the setting file 106a. The reading mode setting unit 102a may allow a user to set the reading mode through an input unit (not illustrated) when the reading mode for each scanner 120 is not registered in the setting data stored in the setting file 106a. FIG. 4 depicts an example of a setting screen that allows a user to register the setting data such as the reading mode.

As shown in the example of FIG. 4, the setting screen includes four tabs labeled as reading mode, image processing, document, and file format. As shown in FIG. 4, when a user selects the document tab through the input unit, for example, the reading mode setting unit 102a controls the input-output control interface unit 108 so as to determine the scanners 120 currently connected to the information processing terminal 100 and set document-related setting to each of the scanner 120. For example, when the user presses a pull-down menu of the "first scanner" illustrated in FIG. 4 through the input unit, the reading mode setting unit 102a reads a setting data list stored in the setting file 106a and displays the list as described above with reference to FIG. 3, to allows the user to select any one out of the size automatic detection, A3, A4, A5, A6, B4, B5, B6 postcard, name card, letter, double letter, and custom sizes as the document size of the first scanner 120-1. The reading mode setting unit 102a may allow a user to select various setting data in this way, store the selected setting data in the setting file 106a, and set the setting based on the stored setting data when the scanner 120 reads documents.

The image file receiving unit 102b is an image file receiving unit that receives image files read by the scanners 120 through the input-output control interface unit 108 and stores the image files in the read image file 106b. The image file receiving unit 102b may store the image file, for example, in such a manner that a read date, a received date, and a file name (e.g., a file name capable of identifying the order of being read) of the image file correspond to each other.

The integrating unit 102c is an integrating unit that integrates the image files received from the scanners 120. For example, the integrating unit 102c may integrate the image files stored in the read image file 106b by sorting them in the order of the read date or the received date to prepare the integrated file 106c. The integrating unit 102c may perform control so as to allow a user to arrange the image files through the input unit.

The information processing terminal 100 is exemplarily structured as described above. An example of a structure of the scanner 120 is explained below.

The scanner 120 is an image-reading apparatus having an image-reading function. The scanners 120 (the first scanner 120-1, the second scanner 120-2, and the third scanner 120-3) may be used for different applications. For example, the first scanner 120-1 may be an auto document feeder (ADF) scanner used for scanning a large quantity of documents. The second scanner 120-2 may be an overhead scanner used for scanning books. The third scanner 120-3 may be a flat bed scanner used for high accuracy image reading. In addition, a multifunction scanner having functions for multiple reading applications may be used. Furthermore, the image-reading apparatus is not limited to the scanner and may be an all-in-one machine having both of an image-reading function and a printing function.

As shown in FIG. 2, the scanner 120 includes a scan button 121, a detection unit 122a, a reading unit 122b, an image file transmission unit 122c, and a reading sensor 123. The structure of the scanner 120 illustrated in FIG. 2 mainly exemplifies the units in common with each scanner 120. The units are not limited to those illustrated in FIG. 2. For example, a drive unit that continuously feeds stacked sheet-like documents may be further included when the scanner 120 is the ADF scanner.

As shown in FIG. 2, the scan button 121 is a document reading start instructing unit that allows a user to input a document reading start instruction.

The reading sensor 123 is a sensor that reads images of documents. For example, the reading sensor 123 may be a line image sensor that reads, from an upper side, a document such as a book and a magazine, which is placed face-up when the scanner 120 is the overhead scanner. When the scanner 120 is the ADF scanner, the reading sensor 123 may be a line image sensor that reads, in a fixed position, documents continuously fed.

The detection unit 122a is a detecting unit that detects that a user operates the scan button 121 (document reading start instruction).

The reading unit 122b is a reading unit that reads a document when the detection unit 122a detects the user's operation (document reading start instruction).

The image file transmission unit 122c is an image file transmitting unit that transmits the image file of the document read by the reading unit 122b to the information processing terminal 100.

The detection unit 122a, the reading unit 122b, and the image file transmission unit 122c may be realized by a control unit such as a CPU. The control unit may set a setting of the scanner 120 in response to a request from the information processing terminal 100. For example, when receiving a request to read a document with resolution of 150 dpi from the information processing terminal 100, the control unit controls the reading sensor 123 so as to scan the document with the resolution. The control unit may execute image processing in response to a request from the information processing terminal 100. For example, the control unit may execute image processing such as error diffusion, dither processing, and automatic binarization on image data read by the reading unit 122b in response to the request. The scanner 120 may include a memory so as to temporarily store therein the read image data. This is the end of the explanation of the structure of the image-reading apparatus (scanner 120).

Processing by Image-Reading System

An example of the processing executed by the image-reading system thus structured of the embodiment is explained below with reference to FIGS. 5 to 7.

Behavior of a Single Scanner 120

The behavior of a single scanner 120 out of the image scanners 120 is explained.

The detection unit 122a of the scanner 120 detects that a user operates the scan button 121. When detecting no user's operation, the detection unit 122a continues to monitor the operation until it is detected.

When the detection unit 122a detects the user's operation, the reading unit 122b of the scanner 120 controls the reading sensor 123 so as to read a document. When receiving a request based on the setting data from the information processing terminal 100, the control unit executes the processing corresponding to the request.

The image file transmission unit 122c of the scanner 120 transmits the image file of the document read by the reading unit 122b to the information processing terminal 100.

In this way, the scanner 120 alone behaves.

Processing Executed by the Information Processing Terminal 100

The processing executed by the information processing terminal 100 connected to the scanners 120 is explained below with reference to FIG. 5. FIG. 5 is a flow chart of an example of the processing executed by the information processing terminal 100. The reading mode setting unit 102a of the information processing terminal 100 may preset a setting to each scanner 120 in advance based on the setting data stored in the setting file 106a or may set a setting to the scanner 120 activated for reading documents when it is determined that reading activation is done in the scanner as described below. The information processing terminal 100 may control the input-output control interface unit 108 so as to execute the following processing when it is detected that the scanners 120 are connected to the information processing terminal 100.

Figure 5:
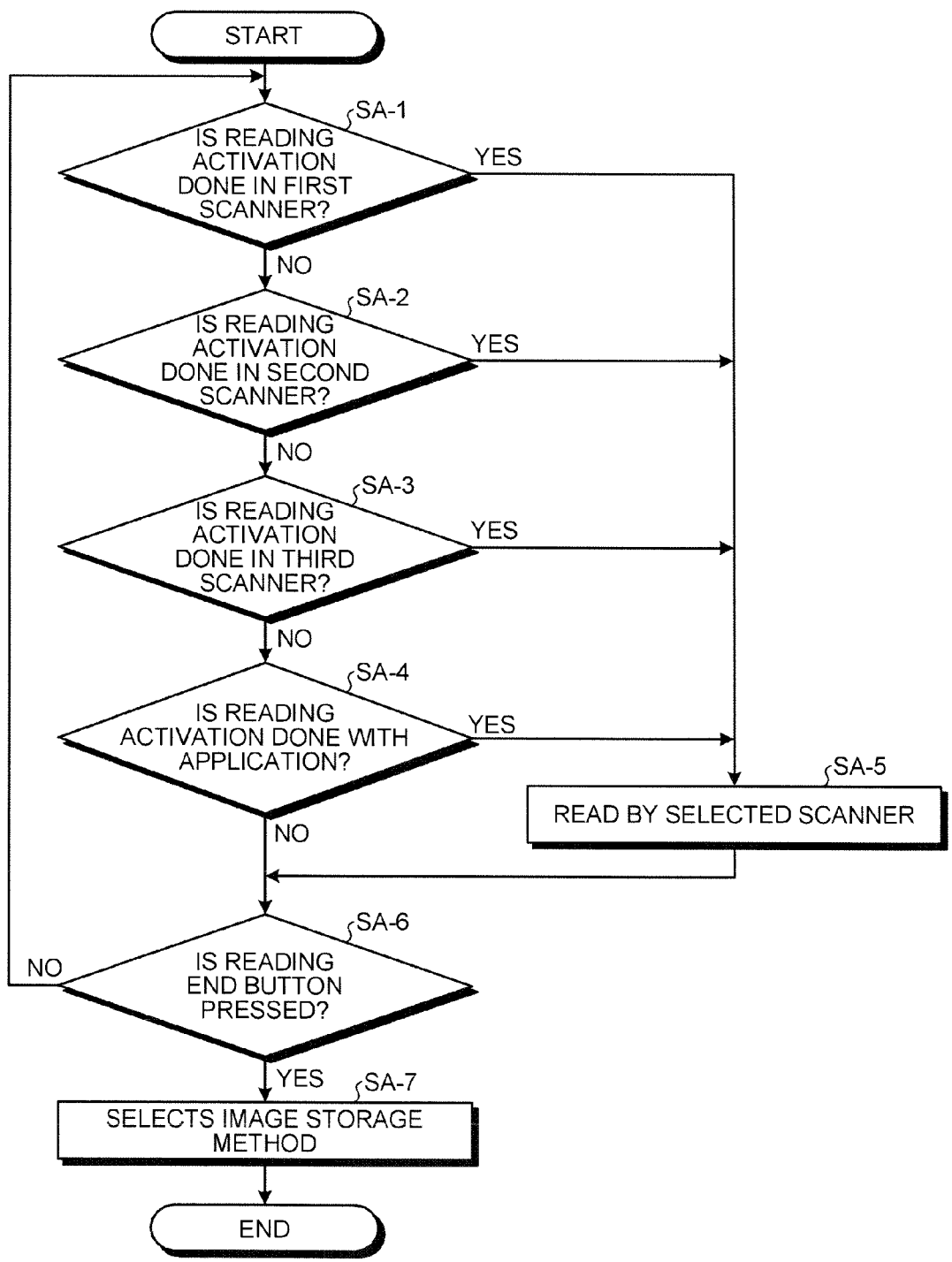
FIG. 5 is a flow chart of an example of the processing executed by the information processing terminal 100.

As shown in FIG. 5, the image file receiving unit 102b of the information processing terminal 100 controls the input-output control interface unit 108 and determines whether reading activation is done in the first scanner 120-1 (step SA-1). The reading activation may be determined when the detection unit 122a of the scanner 120 detects the operation of the scan button 121 or when the reading unit 122b of the scanner 120 reads a document.

If the reading activation is not done in the first scanner 120-1 (NO at step SA-1), the image file receiving unit 102b of the information processing terminal 100 controls the input-output control interface unit 108 to determine whether the reading activation is done in the second scanner 120-2 (step SA-2).

If the reading activation is not done in the second scanner 120-2 (NO at step SA-2), the image file receiving unit 102b of the information processing terminal 100 controls the input-output control interface unit 108 to determine whether the reading activation is done in the third scanner 120-3 (step SA-3).

If the reading activation is not done in the third scanner 120-3 (NO at step SA-3), the image file receiving unit 102b of the information processing terminal 100 determines whether a user inputs an instruction of reading activation to any one of the scanners 120 with an application of the information processing terminal 100 through the input unit (step SA-4).

If it is determined that the reading activation is done at any one of the steps (YES at any one of steps SA-1 to SA-4), the image file receiving unit 102b of the information processing terminal 100 receives a read image file from the scanner 120 selected based on the determination that the reading activation is done and stores the received image file in the read image file 106b (step SA-5).

The image file receiving unit 102b of the information processing terminal 100 determines whether a user presses a reading end button, for example, through the input unit (step SA-6). FIG. 6 depicts an example of a display screen displayed on a display unit (not illustrated) of the information processing terminal 100.

Figure 6:
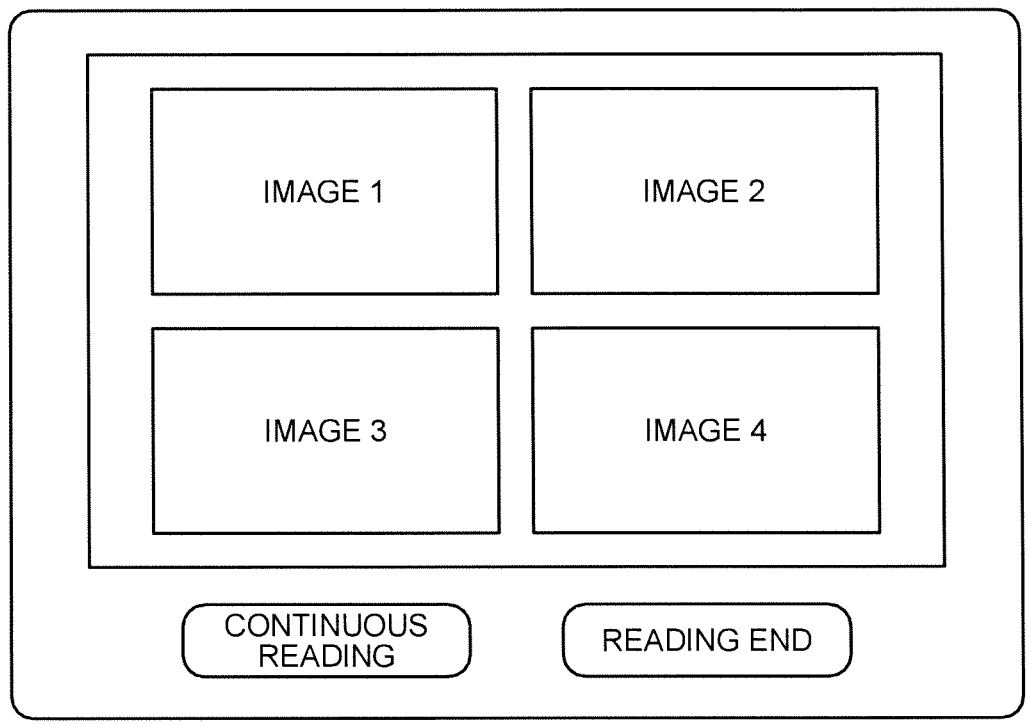
FIG. 6 is a diagram of an example of a display screen displayed on a display unit of the information processing terminal 100.

As shown in FIG. 6, the image file receiving unit 102b may control the display screen to display the received image file in image display areas (images 1 to 4) thereon. The display screen, which is displayed under the control of the image file receiving unit 102b, may include a continuous reading button and the reading end button in addition to the image display areas. If the continuous reading button is pressed or the reading end button is not pressed at step SA-6 (NO at step SA-6), the image file receiving unit 102b returns to step SA-1 and repeats the processing from step SA-1 to step SA-6.

On the other hand, if the reading end button is pressed (YES at step SA-6), the integrating unit 102c selects an image storage method based on the setting data stored in the setting file 106a, integrates the image files stored in the read image file 106b and stores the integrated file in the integrated file 106c (step SA-7). For example, the integrating unit 102c may integrate the image files as a PDF file and store the PDF file in the integrated file 106c. FIG. 7 is a schematic of image files integrated by the integrating unit 102c as a single file.

Figure 7:
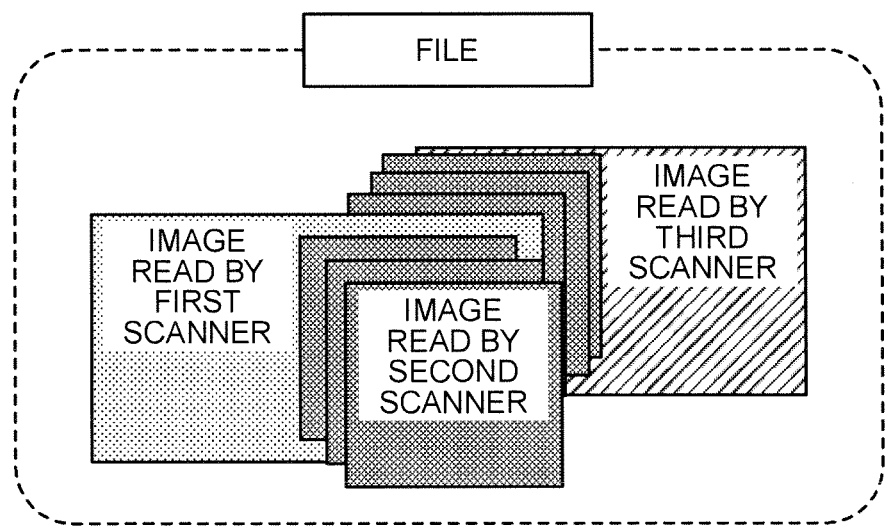
FIG. 7 is a schematic of image files integrated into a single file by an integrating unit 102c.

As shown in FIG. 7, in the file (e.g., PDF file) integrated by the integrating unit 102c, the image files read by the first scanner 120-1, the second scanner 120-2, and the third scanner 120-3 are integrated as the single file. The image files may be sorted in the order of being read based on the file names, read date, or received date or controlled such that a user can arrange them through the input unit.

This is the end of the explanation of the processing of the image-reading system according to the embodiment.

As a result, the present embodiment enables images to be read without burdensome operation such as a document reading start instruction from the information processing terminal when the image-reading apparatuses are connected to the information processing terminal.

According to the present embodiment, the information processing terminal integrates a plurality of image files received from the image-reading apparatuses. As a result, the image files can be organized in the order of being read by the image-reading apparatuses, for example.

According to the present embodiment, the information processing terminal sets the reading mode of the image-reading apparatus. As a result, individual reading modes can be set for each of the image-reading apparatuses.

According to the present embodiment, the image-reading apparatuses are used for different reading applications. For example, reading operation can be simply performed with the image-reading apparatuses, which are used for different reading applications such as difference between an ADF scanner and a flat bed scanner, connected to the information processing terminal.

According to the present embodiment, at least one of the image-reading apparatuses is the overhead scanner. As a result, reading can be performed by simple operation with an image-reading apparatus used for a reading application different from that of the overhead scanner connected to the overhead scanner.

Other Embodiment

The embodiment of the present invention is explained above. However, the present invention may be implemented in various different embodiments other than the embodiment described above within a technical scope described in claims.

For example, an example in which the information processing terminal 100 receives and processes image file from the scanners 120 is explained. However, the information processing terminal 100 may be configured to perform processes in response to request from the external device to carry out the method of the present invention and return the process results such as the integrated image file to the external device.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the information processing terminal 100 and the scanners 120 are merely conceptual and may not necessarily physically resemble the structures shown in the drawings.

For example, the process functions performed by each device of the information processing terminal 100 or the scanner 120, especially the each process function performed by the control unit 102 or the control unit (the detection unit 122a, the reading unit 122b, the image file transmission unit 122c and so on) of the scanner 120, can be entirely or partially realized by CPU and a computer program executed by the CPU or by a hardware using wired logic. The computer program, recorded on a non-transitory computer readable recording medium including programmed commands for causing a computer to execute the method of the present invention, can be mechanically read by the information processing terminal 100 and the scanner 120 as the situation demands. In other words, the storage unit 106 such as read-only memory (ROM) or hard disk drive (HDD) stores the computer program that can work in coordination with an operating system (OS) to issue commands to the CPU and cause the CPU to perform various processes. The computer program is first loaded to the random access memory (RAM), and forms the control unit in collaboration with the CPU.

Alternatively, the computer program can be stored in any application program server connected to the information processing terminal 100 via the network, and can be fully or partially loaded as the situation demands.

The computer program may be stored in a computer-readable recording medium, or may be structured as a program product. Here, the "recording medium" includes any "portable physical medium" such as a memory card, a USB (Universal Serial Bus) memory, an SD (Secure Digital) card, a flexible disk, a magnetic optical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and a Blu-ray Disc.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

Various databases (the setting file 106a to the integrated file 106c) stored in the storage unit 106 is a storage unit such as a memory device such as a RAM or a ROM, a fixed disk device such as a HDD, a flexible disk, and an optical disk, and stores therein various programs, tables, databases, and web page files used for providing various processing or web sites.

The information processing terminal 100 may be structured as an information processing apparatus such as known personal computers or workstations. Furthermore, the information processing apparatus may be structured by connecting any peripheral devices. The information processing terminal 100 may be realized by the information processing apparatus in which software (including program or data) for executing the method according to the present invention is implemented.

The distribution and integration of the device are not limited to those illustrated in the figures. The device as a whole or in parts can be functionally or physically distributed or integrated in an arbitrary unit according to various attachments or how the device is to be used. That is, any embodiments described above can be combined when implemented, or the embodiments can selectively be implemented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image-reading system, comprising:
 a plurality of image-reading apparatuses each including a document reading start instructing unit; and
 an information processing terminal connected to the image-reading apparatuses, wherein each of the image-reading apparatuses includes:
  a detecting unit that detects that a user operates the document reading start instructing unit;
  a reading unit that reads a document when the detecting unit detects the operation of the user; and
  an image file transmitting unit that transmits an image file of the document read by the reading unit to the information processing terminal, and
 each document reading start unit is associated one-to-one with a reading unit of corresponding one of the plurality of image-reading apparatuses.

2. The image-reading system according to claim 1, wherein the information processing terminal further includes an integrating unit that integrates the image files received from the image-reading apparatuses.

3. The image-reading system according to claim 1, wherein the information processing terminal further includes a reading mode setting unit that sets a reading mode of the image-reading apparatus.

4. The image-reading system according to claim 1, wherein the image-reading apparatuses are used for different applications from each other.

5. The image-reading system according to claim 1, wherein at least one of the image-reading apparatuses is an overhead scanner.

6. The image-reading system according to claim 1, wherein each document reading start unit is associated only with a reading unit of corresponding one of the plurality of image-reading apparatuses.

* * * * *